（12) United States Patent
Anders et al.

(10) Patent No.: US 9,473,230 B2
(45) Date of Patent: Oct. 18, 2016

(54) SYSTEM AND METHOD FOR WIRELESS BROADBAND COMMUNICATION

(71) Applicants: Joseph Clifton Anders, Pompano Beach, FL (US); Seacol Chin, Pompano Beach, FL (US); Tyler Harris, Pompano Beach, FL (US); Francisco David Ortiz, Pompano Beach, FL (US); Diego Nunez, Pompano Beach, FL (US)

(72) Inventors: Joseph Clifton Anders, Pompano Beach, FL (US); Seacol Chin, Pompano Beach, FL (US); Tyler Harris, Pompano Beach, FL (US); Francisco David Ortiz, Pompano Beach, FL (US); Diego Nunez, Pompano Beach, FL (US)

(73) Assignee: IT CENTRICITY, LLC, Pompano Beach, FL (US)

( * ) Notice: Subject to any disclaimer, the term of this patent is extended or adjusted under 35 U.S.C. 154(b) by 24 days.

(21) Appl. No.: 14/578,251

(22) Filed: Dec. 19, 2014

(65) Prior Publication Data

US 2015/0180566 A1    Jun. 25, 2015

Related U.S. Application Data

(60) Provisional application No. 61/918,629, filed on Dec. 19, 2013.

(51) Int. Cl.
  *H04B 7/06* (2006.01)
  *H04B 7/10* (2006.01)
  *H04B 7/12* (2006.01)

(52) U.S. Cl.
  CPC ............. *H04B 7/10* (2013.01); *H04B 7/0617* (2013.01); *H04B 7/12* (2013.01)

(58) Field of Classification Search
  CPC ......................... H04B 7/0617; H04B 7/0602
  USPC ............ 455/456.1, 404.2, 456.3, 464, 452.1, 455/509
  See application file for complete search history.

(56) References Cited

U.S. PATENT DOCUMENTS

| | | | | |
|---|---|---|---|---|
| 7,149,773 B2 * | 12/2006 | Haller | ................. | A61B 5/0031 607/27 |
| 2006/0120329 A1 * | 6/2006 | Kim | ..................... | H04W 36/14 370/331 |
| 2010/0248704 A1 * | 9/2010 | Pavel | ................. | H04M 1/6025 455/416 |

* cited by examiner

*Primary Examiner* — John J Lee
(74) *Attorney, Agent, or Firm* — Butler Snow LLP

(57) ABSTRACT

The current invention is a system and method for facilitating high-quality broadband wireless communication in a mobile environment. The present invention also offers significantly improved performance over currently available land-based systems, as high bit rate data connectivity is made possible over long distances by utilizing multiple frequencies, antennas, polarizations, modulations, and radios to optimize propagation and accomplish the delivery of synchronous and asynchronous data connections to a seagoing vessel (or other such user, such as a plane or vehicle).

10 Claims, 2 Drawing Sheets

SYSTEM AND METHOD FOR WIRELESS BROADBAND COMMUNICATION

CROSS-REFERENCE TO RELATED APPLICATIONS

This application claims the benefit of U.S. Provisional Application No. 61/918,629 which was filed Dec. 19, 2013, and is hereby incorporated by reference for all that it teaches.

FIELD OF THE INVENTION

The present invention relates generally to wireless communication systems and methods. More particularly, the present invention relates to systems and methods for to providing high-speed data connections to customers who require high volume and speed data in difficult service locations. The current application is described herein with examples for maritime use, but could apply to many other environments with similar data challenges.

BACKGROUND OF THE INVENTION

Wireless communication systems are utilized today in a wide variety of applications. Providing diverse types of communication, including voice, data transfer, and web browsing, these wireless systems have become nearly ubiquitous in our daily lives.

In general, signal strength is a critical factor in establishing a communication link with good quality of service. Decreased signal strength can affect the performance of a broadband communication system substantially, particularly where many users are attempting to access the interact, for example, via a single access point, as is common on seagoing vessels such as cruise ships.

Although land-based wireless communication systems may experience some limited signal degradation due to environmental interference, these issues are exacerbated in a marine environment, particularly where signals must be transmitted over long distances. When radio waves come in contact with the ground, for example, they are mostly absorbed and dispersed. With respect to signal propagation over a body of water, however, weather and environmental factors may cause significant inference with the signal. High humidity over a body' of water can cause significant issues with scatter, which increases noise, and the surface of the body of water may reflect and/or refract the signal. Thus, when traveling over water, radio waves tend to bounce, skip, reflect and refract, and due to the curvature of the earth, it is inevitable that some radio waves will hit the water's surface. As such, transmission of a signal over a long distance in a marine environment can involve significant waveform distortion and interference from the signal's hitting the water. Another problem encountered when transmitting a signal over a long distance is that the beam of the radio wave expands greatly (e.g., a beam that is 1.5 inches wide/tall at the transmitting antenna will expand to over 300 ft. at 50 miles away); therefore, some of that waveform will be lost to the sea. These issues can cause loss of connectivity or performance, particularly in systems utilizing a single, high-performance beam.

Currently available systems for providing internet access to seagoing vessels via land-based transceivers tend to perform poorly at long distances, as these systems utilize a single connection with a 64-QAM modulation scheme. Using that technique, even an 11 Mbs connection is not likely to be stable, or even possible, if the signal level is any lower than −78 dBm. Furthermore, even at short distances (e.g., when a seagoing vessel is in port), other vessels may simultaneously be competing for the same bandwidth on the same channel on the same frequency, resulting in poor service for all. A crowded port may also generate a high radio noise level, which can cause additional performance issues.

Thus, most maritime data communication requirements are currently addressed using satellite connections. Currently available satellite systems typically provide internet access at little more than dial-up speeds, however, as limited bandwidth and latency issues reduce performance. The limited internet access currently offered by cruise ships, for example, discourages use due to its slow speeds and relative cost. Moreover, these satellite connections were designed for much slower asynchronous connections, which are insufficient for today's increasing data demands. Streams and high-density data, such as pictures and graphics, are already compressed. Thus, the caching and compression methods used in the past to hide poor throughput on satellite systems are not effective on the newer forms of data, which involve increasingly dense data types. As the evolution of the networks continue, more data is originating from the clients, and, therefore, the "up" bandwidth is as important as the "down," None of the current satellite systems provide symmetrical network connections today. Therefore, until such time as satellite systems deploy that can meet these demands, an alternative is required.

SUMMARY OF THE INVENTION

The present system uses multiple radios, antennae, frequencies and polarizations to accomplish the delivery of synchronous and asynchronous data connections to the vessel (or client) during its various courses on the waters throughout the world. Since ships travel long distances and cross many political boundaries, the system must determine the appropriate frequencies and power levels to comply with the many regulations. It is also necessary for the system to analyze the current conditions on each eligible frequency to determine the best possible legal combination of radios and antennae for use in any given location and time. Distances and crowded ports present additional considerations due to radio propagation and high radio noise level respectively.

The present system uses redundant GPS feeds to determine the position of the vessel in the world. Once this location is determined, the present invention determines the regulatory environment and thus the available frequencies and power levels. Once the system has determined these parameters, it activates the appropriate radios and determines the best signals, lowest congestion and best polarizations. It then establishes the connections and delivers the contracted data bandwidth. The system continuously monitors the connections and actively looks for better configurations. Invisibly to the client, the system will move from connection to connection ensuring the best performance available without disruption of the current data activity. Additionally, multiple circuits are combined to increase total available throughput.

Due to the long distance requirements over water, specialized coding and beam forming are utilized to mitigate the signal lost to the water caused by the curvature of the earth. Based on sea conditions and the angle of the signal, some of the signal is reflected and refracted off the water surface. Special algorithms are employed to reject unusable signal. Polarizations are also used to increase performance under these circumstances. Further, multiple lower grade but stable connections are combined to meet the bandwidth requirements. This system continuously monitors and evaluates connections to provide the best possible bandwidth available in the client location.

BRIEF DESCRIPTION OF THE DRAWINGS

Further advantages of the invention will become apparent by reference to the detailed description of preferred embodiments when considered in conjunction with the drawings.

DETAILED DESCRIPTION OF THE INVENTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

The frequencies used for this description are suggestive and not the only frequencies that could be used by the system. Frequencies and their uses are determined by geopolitical bodies that try to coordinate with their surrounding entities. The system could be fitted with any frequencies that a jurisdiction may allow for use in the provisioning of data services to vessels.

All frequencies have characteristics that can make them more or less attractive for the specific case of use. The purpose of this system is to provide the best available connections on multiple frequencies at a time, aggregate the data bandwidth of the connections and present this data connection to the vessel for its use. The system continuously monitors and adjusts the connections and links to provide the vessel the best possible bandwidth and throughput for the location.

We disclose a system designed to be able to automatically adjust the following parameters of multiple radio connections (in an exemplary embodiment, up to three different frequency bands) providing the highest possible performance of the wireless data connections, and then aggregate these connections into one pool of bandwidth available for the moving vessels use. The system continuously monitors and adjusts the following settings on all three frequency bands: frequency and channels, channel size, polarization, amplifier power adjustments, and it can activate specific phased arrays for focused transmissions and receptions.

Additionally the system can be configured with a second system that will work in coordination. This provides up to six connections across three separate frequency bands all aggregated into one data pool for the customer. It should be appreciated that embodiments with more than three frequency bands would further increase the number of connections to the data pool.

Figure 1:
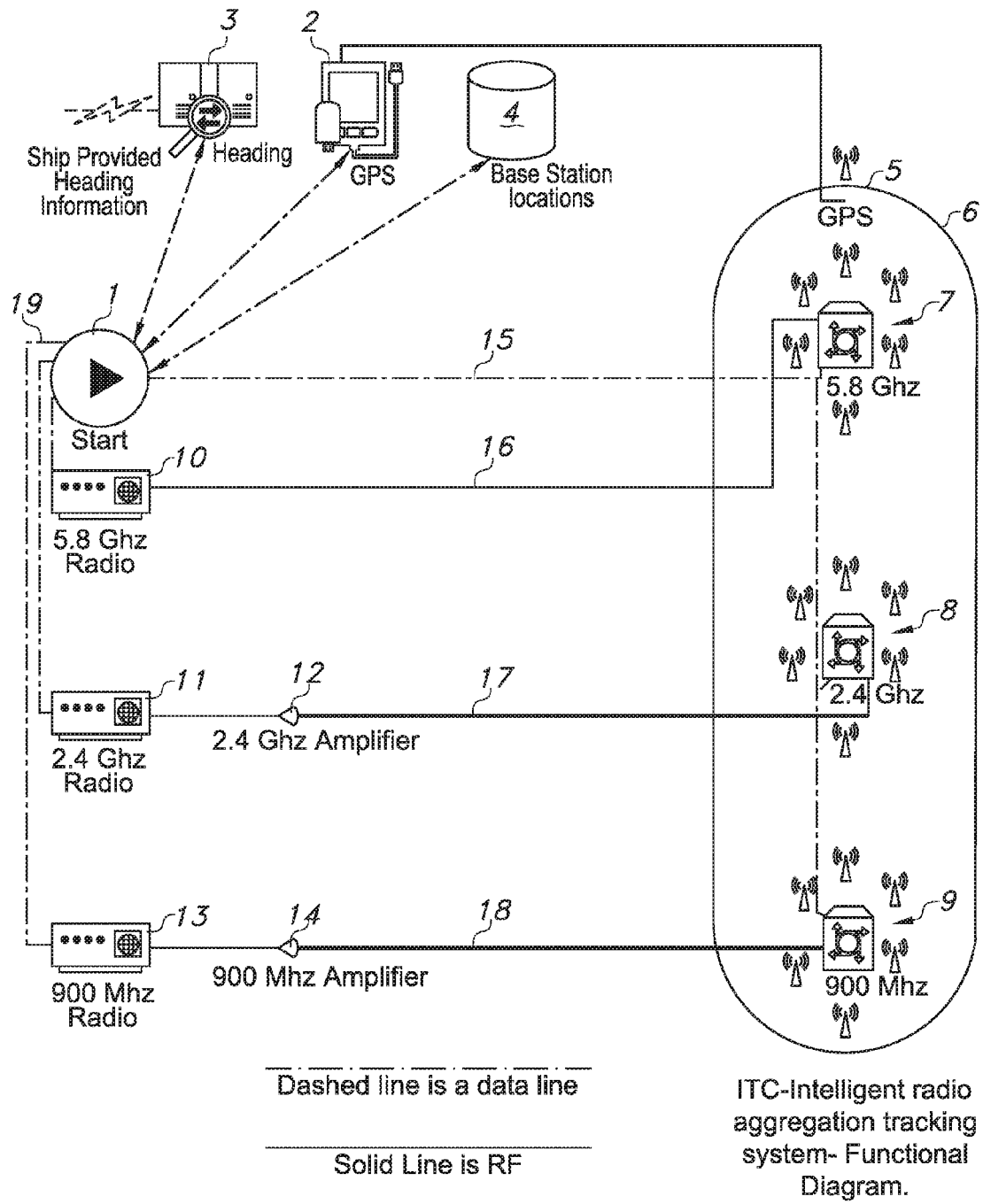
FIG. 1 is a system infrastructure diagram illustrating how various communication elements of the system are interconnected.

Referring to the drawing for a better understanding of the structure and function of the invention, FIG. 1 shows a schematic view of the components utilized by the present invention during typical embodiment wherein a broadband wireless connection is provided to a cruise ship. As the vessel moves along a course, it will come into range of some base stations and move out of range of others. These base stations are preferably located on land, and have existing high speed connections to the internet.

The system first determines the location and heading of the ship. The system utilizes a GPS processor 2 that takes global positions signals gathered from a high-sensitivity GPS antenna 5 to determine the current longitude and latitude of the unit. In a preferred embodiment, GPS antenna 5 is located on top of the Quad-band antenna closure 6. Heading information is provided by a heading unit 3 that receives heading information from instruments on the vessel. The location and heading information is then provided to database 4 that to determine the best resources available for getting a broadband connection at the current location. Database 4 is a data repository containing the locations of all transceivers the system shall have access to in its respective location. This repository can be updated remotely as new transceivers are added or existing ones moved. The information includes, but is not limited to: exact longitude and latitude, elevation and frequencies active at the site. It also contains the geopolitical information for determining appropriate regulatory limits and standards.

The information regarding available base stations and their characteristics such as frequency, channel, and channel width are provided to main processor 1. This is the main processor(s) where the logic is programmed, data gathered and decisions are made regarding ideal base stations and the methods of communicating with them. This unit drives the operational aspects of all other components in the system.

Main processor 1 then instructs the three antenna arrays located within quad-band antenna enclosure 6 which elements to energize for connections. 5.8 Ghz antenna array 7 includes a 1×6 RF switch and six arrays spaced around a circle providing 360° of coverage. Similarly 2.4 Ghz antenna array 8 includes a 1×6 RF switch and six arrays spaced around a circle providing 360° of coverage, and 900 MHz antenna array 9 includes a 1×6 RF switch and six arrays spaced around a circle providing 360° of coverage. The instructions from main processor 1 are provided to the RF switch of each frequency over data transmission line 15. This data transmission line may be any communication cable including serial, usb, or Ethernet. By using specific elements, the system concentrates the energy and focus for the best connections to the base stations.

Each of the three antenna arrays is further linked to a transceiver that drives the antenna array system. The 2.4 Ghz and 900 Mhz signals are preferably amplified as well. 5.8 Ghz RF connection 16 is a connection from 5.8 Ghz transceiver 10 that drives the 5.8 Ghz antenna array 7. 2.4 Ghz RF connection 17 is a connection from 2.4 Ghz transceiver 11 that drives the 2.4 Ghz adjustable RF amplifier 12 which continues to provide the amplified RF to the 2.4 Ghz antenna array 8. 900 Mhz RF connection 18 is a connection from 900 Mhz transceiver 13 that drives the 900 Mhz adjustable RF amplifier 14 which continues to provide the amplified RF to the 900 Mhz antenna array 9.

The ship uses a feedback loop 19 to make adjustments as the vessel moves and link angles to the base stations change.

Through the same feedback loop 19, main processor 1 can increase or decrease the output of Ghz adjustable RF amplifier 12 and 900 Mhz adjustable RF amplifier 14 to best match the connection level desired. This is done with the knowledge provided of the limits in the area by the database 4. This entire process runs continuously making all adjustments necessary to maintain the very best connections and thereby best throughput available for each area.

The system continuously evaluates the signal to determine the power and frequency combination for the best signal. But it is also continuously determining if it should connect to another base station. Based on location and heading information, the system determines if the next base station that the vessel is approaching would provide better connectivity. It relies on information stored in database 4 to determine which antenna arrays need to be activated and the appropriate channel, power, polarity, and any necessary beam forming required to connect with the next base station. Even if the base station is in another country with different regulations regarding frequency and power, the system can seamlessly connect to the base station to provide continuous coverage.

The system is designed to use all three frequencies at all times or only the specific frequencies that are appropriate in each location. Additionally, the system provides for two complete systems to run on the same vessel providing both redundancy and additional bandwidth with more connections. This is especially useful in situations where a mount location on a vessel cannot be found that does not have some view blocked by obstructions on the vessel such as smoke stacks. In this case, the two systems provide overlap in most areas and by placing the second system in a strategic location the blockage can be overcome.

The two systems are aware of each other, and they coordinate their connections to maintain the best possible combination for stability and throughput. Through the use of a border gateway protocol (BGP) routing scheme, there is IP address coordination allowing for the ship to maintain different connections without losing IP address continuity.

Adjusting Polarization

As stated previously, the system continuously monitors and adjust various settings on all three frequency bands. For example, polarization may configured to enhance the signal. In one embodiment, marine broadband communication is enhanced by providing a first antenna configured to communicate using a signal orientation corresponding to a first polarization, and a second antenna configured to communicate using a signal orientation corresponding to a second polarization having at least one characteristic difference from the first polarization. The first polarization may be substantially orthogonal to the second polarization. In a preferred embodiment, the first polarization is horizontal, and the second polarization is vertical. As part of the marine broadband system, an RF communication transceiver is situated on a ship. In this system, a network of base stations is deployed with antennas that are designed to provide coverage for ships traveling along particular navigation paths. These base stations may relay a composite signal to a modem disposed on the ship, which in turn can communicate with onboard wireless communication devices. Alternately, the base stations may relay a signal directly to the wireless communication devices.

A first antenna is situated on the ship and configured to communicate using a signal having an orientation corresponding to a first polarization (e.g., a substantially horizontal polarization). Also situated on the ship is a second antenna configured to communicate using a signal having an orientation corresponding to a second polarization (e.g., a substantially vertical polarization). As previously described, the antennas may, individually or collectively, be connected to amplifiers, passive or active signal boosters, or radio equipment, such as receivers. As an example, the antennas may be connected to a processor (such as main processor 1) for establishing communication links using the antennas. Main processor 1 may rely on information about base stations located in database 4 to control the antennas to (for example) activate, deactivate, or change polarization. Main processor 1 may also rely on information in database 4 for encoding and decoding data, multiplexing and demultiplexing signals, storing and routing packets of information, and/or establishing and maintaining communication links with another entity.

If the first and second polarizations are orthogonal to each other, the first antenna, being configured to communicate using a signal with a first polarization, would ideally intercept none of the signal with which the second antenna communicates. Similarly, the second antenna, being configured to communicate using a signal with a second polarization, would ideally intercept none of the signal with which the first antenna communicates. Because polarization of a signal may change due to environmental and other factors, a processor may be used to isolate transmissions of a particular polarization.

The effective doubling in bandwidth provided by the use of two antennas of different polarizations can be used to enhance reception, reduce dead spots, and increase the signal carrying capacity of the network. While the above examples refer to only two antennas, multiple antennas may be utilized to enhance the stability and potential aggregate bandwidth of the connection.

Beam Forming

In a further embodiment, beam-forming is utilized to enhance wireless broadband communication. In beam-forming, signals from a discrete set of antennas (which may be directional or omni-directional) are combined digitally or electrically to simulate a larger, directional antenna. The antennas may be individually or simultaneously connected to amplifiers, passive or active signal boosters, or radio equipment, such as receivers. A processor, such as main processor 1, is configured to combine the signals received from the first antenna and the second antenna in a proportion based on an algorithm for selecting a signal according to a signal quality measurement. The signal quality measurement may include a signal to interference plus noise ratio, signal to interference ratio, signal to noise ratio, or any of the signal quality measurements known in the art. The signal quality measurement may include a first measurement from the first antenna and a second measurement from the second antenna, where the algorithm includes a minimum mean squared error algorithm, an equal gain combining algorithm, a maximal ratio combining algorithm, or any other convenient combining algorithm applied to the first measurement and the second measurement. The beam may be formed adaptively, and the weighting of the antennas may be adapted on-the-fly.

As an example, if the first antenna has a high signal quality measurement, while the second antenna has a low signal quality measurement, the algorithm will select for the first antenna, and the processor will combine the signals from the antennas in such a way that a greater weight is made to the first antenna than to the second antenna, in this manner, a "beam" is formed in a direction outward from the first antenna. When the antennas are used for receiving transmissions, the two antennas thus function as a virtual single directional antenna, pointed in the direction of the first antenna and thus receiving signals from this direction in particular. When the antennas are used for broadcasting, the two antennas again function as a virtual single directional antenna, sending energy in the selected direction. Beam formation may also improve signal quality by nulling signals in other directions.

The algorithm for signal quality measurement may be based on data received at the ship or at one or more land-based base stations. Alternatively, it may be pre-programmed into database 4 for use by main processor 1. Accordingly, when the antennas are used for receiving signals, a beam may be formed in the direction of the signal of highest quality as measured at the antenna. If the antennas are also (or alternately) to be used for broadcasting, the receiving sites can report a signal quality measurement to the processor, and the processor can use the algorithm to form a transmission beam in the direction of the receiving site which reports the highest quality signal.

By adjusting the proportion of signal sent to or received from a plurality of antenna elements, one can form a beam toward a desired base station and put a null toward an interfering base station. One may further form a beam on the transmit side toward a desired base station and reduce interference toward any other base stations, thereby increasing the reverse link capacity. The above examples refer to two antennas, but any number of antennas may be used to resolve a more accurate beam or to improve signal strength.

Figure 2:
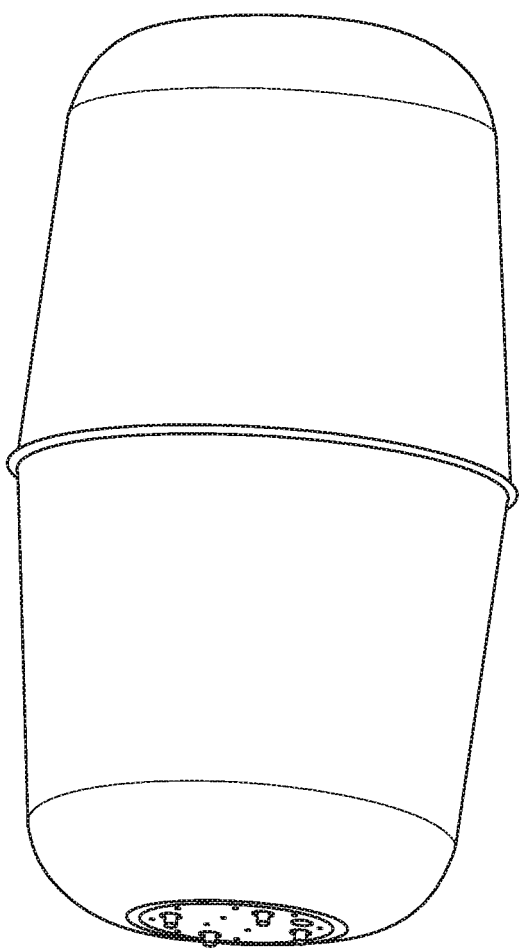
FIG. 2 is a depiction of a radiome covered assembly containing the system.

As shall be appreciated from FIG. 2, in a preferred embodiment, each system is packaged in a radome covered assembly that is mounted on a single 2.5+ inch pole. The assembly is constructed so that all serviceable parts are exposed by removing two sections of the lower part of the radome. This also allows for rapid deployment as the only site preparation will be the run of proper fiber or CAT5e cables and DC power. Leveling bubbles may be included in the assembly for installation purposes.

The present invention is different from such products as routers configured with redundancy in its data provider links. In such systems, the system simply measures the bandwidth and delay on each provider connection to determine the best connection. The router has no method to make any frequency or radio changes to the multiple redundant links. Just routing decisions based on best throughput.

The present invention is also set apart by the intelligence of both its logical location and its physical location at every second. Since the client is or can be mobile, it roams disparate networks. Therefore, it must constantly evaluate its resources in the form of radios, power settings and polarizations.

The present invention is set apart from a cellphone type device in that cellphones have different radio frequencies, but they do not change polarization or power based on political location. Additionally, a cellphone can only operate on one cell frequency at a time, not multiple for added bandwidth. Cellphones also do not use GPS location to determine frequency or other settings while determining the best network connection.

The clients maintain the same IP address at all times, and the system provides information centrally as to what base stations it is currently connected. This allows anyone on the Internet (or private network) with the appropriate rights to access the clients directly.

While the invention is shown in one form, it will be obvious to those skilled in the art that it is not so limited but is susceptible of various changes and modifications without departing from the spirit thereof. The word "exemplary" is used herein to mean "serving as an example, instance, or illustration." Any embodiment described herein as "exemplary" is not necessarily to be construed as preferred or advantageous over other embodiments. The word "example" is used herein to mean "a non-limiting example." Each example provided herein is an illustration of merely one embodiment; many others may exist, and no provided example should be construed as limiting an otherwise broader category.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A system for facilitating high-quality broadband wireless communication in a mobile environment comprising a location-aware processor and a first antenna operating at a first frequency and a second antenna operating at a second frequency, wherein the location-aware processor continuously monitors and adjusts radio connections between the antennas and at least one base station to optimize the flow of data between the mobile environment and the at least one base station, and wherein the location: aware processor selects communication frequency based on stored data regarding country specific regulatory information.

2. The system of claim 1 wherein the location-aware processor aggregates the connections into one pool of bandwidth.

3. The system of claim 1 wherein the location-aware processor controls the first antenna and the second antenna based on data from a global positioning system.

4. The system of claim 1 further comprising the ability to adjust polarization to obtain better connectivity with the at least one base station.

5. The system of claim 1 further comprising the ability to use beam forming to obtain better connectivity with the at least one base station.

6. A system for facilitating high-quality broadband wireless communication in a mobile environment comprising a location-aware processor and a first antenna operating at a first frequency and a second antenna operating at a second frequency and a third antenna operating at a third frequency, wherein the location-aware processor continuously monitors and adjusts radio connections between the antennas and at least one base station to optimize the flow of data between the mobile environment and the at least one base station, and wherein the location: aware processor selects communication frequency or signal power based on stored data regarding country specific regulatory information.

7. The system of claim 6 wherein the location-aware processor aggregates the connections into one pool of bandwidth.

8. The system of claim 6 wherein the location-aware processor controls the first antenna, the second antenna, and the third antenna based on data from a global positioning system.

9. The system of claim 6 further comprising the ability to adjust polarization to obtain better connectivity with the at least one base station.

10. The system of claim 6 further comprising the ability to use beam forming to obtain better connectivity with the at least one base station.

* * * * *